US012792634B2

(12) United States Patent
Smith et al.

(10) Patent No.: US 12,792,634 B2
(45) Date of Patent: Nov. 10, 2026

(54) PROCESS MINING REPOSITORY FOR ANALYZING PROCESS DATA

(71) Applicant: Celonis SE, Munich (DE)

(72) Inventors: Timothy Smith, Munich (DE); Ryan Weber, Munich (DE); Ardan Arac, Munich (DE); Ari Wilson, Munich (DE); Alex Monroe, Munich (DE); Meriton Husaj, Munich (DE)

(73) Assignee: CELONIS SE, Munich (DE)

( * ) Notice: Subject to any disclaimer, the term of this patent is extended or adjusted under 35 U.S.C. 154(b) by 0 days.

(21) Appl. No.: 19/123,748

(22) PCT Filed: Oct. 30, 2023

(86) PCT No.: PCT/EP2023/080234

§ 371 (c)(1),
(2) Date: Apr. 23, 2025

(87) PCT Pub. No.: WO2024/089292

PCT Pub. Date: May 2, 2024

(65) Prior Publication Data

US 2026/0154291 A1 Jun. 4, 2026

(30) Foreign Application Priority Data

Oct. 28, 2022 (EP) .................................... 22204415

(51) Int. Cl.
*G06F 16/20* (2019.01)
*G06F 16/2458* (2019.01)
*G06F 16/28* (2019.01)

(52) U.S. Cl.
CPC ........ *G06F 16/283* (2019.01); *G06F 16/2465* (2019.01)

(58) Field of Classification Search
None
See application file for complete search history.

(56) References Cited

U.S. PATENT DOCUMENTS

2021/0266178 A1* 8/2021 Grube .................. H04L 9/3247
2021/0398118 A1* 12/2021 Stark ...................... G06N 20/00
2023/0043805 A1* 2/2023 Williams ............ G06F 16/3322
2023/0044106 A1* 2/2023 Zhang ..................... G06F 16/36
2024/0038226 A1* 2/2024 Nouri .................... G10L 15/063

FOREIGN PATENT DOCUMENTS

WO WO2010054351 A2 5/2010

OTHER PUBLICATIONS

International Search Report and Written Opinion of the International Searching Authority, dated Nov. 28, 2023, from corresponding International Application No. PCT/EP2023/080234.

* cited by examiner

*Primary Examiner* — Jau Shya Meng
(74) *Attorney, Agent, or Firm* — Thomas | Horstemeyer, LLP

(57) ABSTRACT

A computer-implemented method generates a process mining repository for analyzing process data, wherein the process data is a multidimensional large-scale dataset which is extracted from at least one external computer system and transformed into a number of data models. The process mining repository represents a process workspace, in which the user may conduct process mining on a valid data model. The user may explore process data, for instance, using a dynamic question and answer framework.

14 Claims, 5 Drawing Sheets

PROCESS MINING REPOSITORY FOR ANALYZING PROCESS DATA

CROSS-REFERENCE TO RELATED APPLICATIONS

Figure 1:
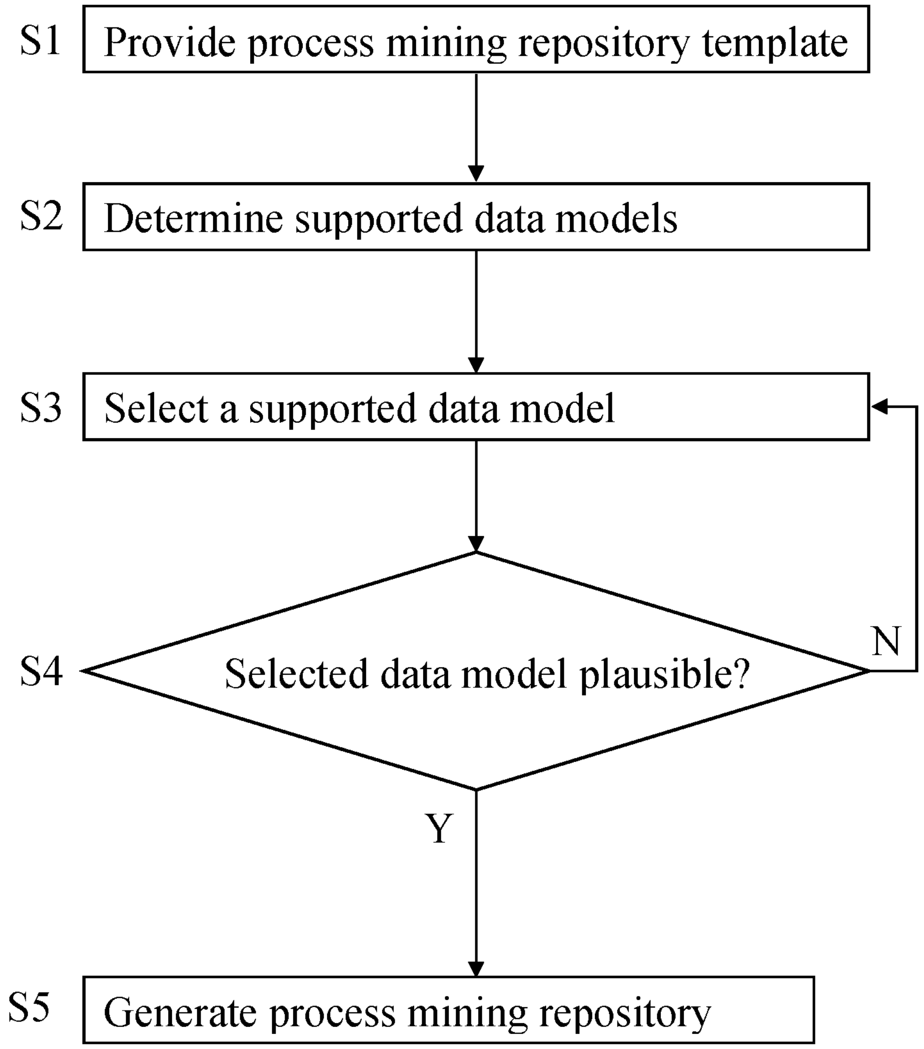

This application is a national phase entry of International Patent Application No. PCT/EP2023/080234, filed Oct. 30, 2023, which claims the benefit of EP 22204415.8, filed Oct. 28, 2022, the entire disclosures of which are hereby incorporated herein by reference in their entirety.

FIELD OF THE INVENTION

The present invention relates to a computer-implemented method to generate a process mining repository for analyzing process data, wherein the process data is a multidimensional large-scale dataset which is extracted from at least one external computer system and transformed into a number of data models.

BACKGROUND OF THE INVENTION

Today, companies execute a vast amount of processes in which a tremendous amount of data is generated and collected. The goal often is data-driven decision making which involves leveraging knowledge and value from the recorded process data. Usually, the relevant knowledge is extracted using process mining tools. In doing so, companies may discover relevant insights about its processes.

Traditionally, individual companies and/or organizations have their own custom source system(s) which hold all their data. For connecting custom source system(s), connector functionality provided by the process mining system and/or standalone connectors are typically used to extract the data from the source system(s) and then to transform it into a structure or a format with which the process mining tool can work. With having a source system connected to the process mining tool, the next steps typically involve crafting queries to capture current process performances from the data and implementing monitoring of these results-typically, by constructing dashboards within the framework of the process mining tool, which can be labor-intensive.

To work on data ingested from custom external source system(s) requires specialized analysts, who have gone through extensive training to learn the applicable means of querying the data in the process mining tool and building dashboards. Further, the analysts need to build up knowledge to act as a translator between the ones who implement the processes and the ones that operate the technology supporting the processes.

The users of the process mining tool having the most relevant business knowledge about the executed processes, instead, are often not prepared to use such tools. As a result, organizations may suffer slow adoption rates of data-driven decision making.

Clearly, adopting a traditional process mining tool requires effort and often technical skills, whereas business departments need to run the daily operations leaving no time to invest in training themselves on such a tool by learning the technical skills of a specialized analyst.

Accordingly, the time needed to make a decision based upon the analysis generated by a process mining tool is long since those who are in the position to make the decision may not get relevant analysis results quickly enough. As a consequence, the value to be derived from using a process mining tool is reduced.

OBJECT OF THE INVENTION

It is therefore an object of the present invention to provide a method which reduces the complexity and cognitive challenge to conduct process mining analysis on large-scale process data.

SOLUTION ACCORDING TO THE INVENTION

This object is solved by the computer-implemented method of the independent claim. Further advantageous embodiments are provided in the dependent claims. Provided is a computer-implemented method to generate a process mining repository for analyzing process data, wherein the process data is a multidimensional large-scale dataset which is extracted from at least one external computer system and transformed into a number of data models. Each data model comprises a number of recorded executions of processes, wherein each process comprises a number of process steps and executing the number of process steps generates a process instance.

The method comprises:

- providing a process mining repository template which is stored in a storage device and comprises a number of process mining questions and a predefined set of rules that provide an answer to each process mining question,
- determining a number of supported data models out of the number of data models by validating each data model using the predefined set of rules,
- selecting a specific one of the determined data models, and
- generating the process mining repository by combining the selected data model with the process mining repository template in order to enable executing the number of process mining questions on the selected data model.

The information on the executed process instances may be gathered automatically, e.g., by using process sensors in a manufacturing line or along business processes. The method according to the invention provides an out-of-the-box solution for setting up an environment for process mining, subsequently also called process workspace.

The gist of the present invention is to establish a process workspace that reduces the cognitive challenge for analyzing large-scale process data by generating a process mining repository.

The method to generate the process mining repository may be fully automated. Based on the predefined set of rules that is comprised in the provided process mining repository template the supported data models are determined. Selecting a specific one of the supported data models may be either executed manually or automatically, e.g., by identifying the data model which is best fitting with respect to the set of rules. Further, the process mining repository template is combined with the selected data model, for instance, by inserting a unique reference to the selected data model, in particular to an interface to the selected data model, into the process mining repository template.

Hence, the process workspace basically eliminates the manual work, which often additionally requires deep technical skills, to locate a valid data model, preferably the best fitting data model, which only comprises the process instances most relevant for discovering a sought-for insight. As a result, the search space for any subsequent process analysis is effectively reduced, since only a relevant part of the overall recorded process instances is made available in the process workspace.

A further advantage of the method according to the invention is that the time required to acquire a sought insight starting off from the access to multiple data models transformed from external source systems is reduced. In practice, the starting point often is access to one hundred or more data models. Hence, a manual analysis of a typical number of data models requires multiple attempts only to locate the relevant data model. The process mining repository, in contrast, reduces the access to the entire dataset to access to one specific data model that is valid with respect to the sought insight, i.e., for which receiving a valid analysis result is guaranteed.

Further, it easily occurs in practice that data models are misconfigured in a way that prevents analysis, but it would take several hours of work for someone to figure the misconfigured data models out. This validity check thus also enables the non-technical user to specifically ask her data expert to reformat the data of data models that do not pass the validity check in a more standardized way.

The generated process mining repository comprises a number of process mining questions through which the cognitive challenge of analyzing or mining process data is dramatically reduced. Each process mining question provides, upon its execution in the selected data model, an answer, wherein the answer comprises an analysis result. Hence, a user of the method according to the invention may set up a process mining environment and directly receive custom analysis results, e.g., key performance indicators (KPIs) particularly relevant to her, by simply selecting appropriate process mining questions. Additionally, the user may set up filters and/or input parameters to change, filter and/or tweak the analysis result. As a result, the user is enabled to understand her processes and to support her decision-making in a self-serviceable way.

The predefined set of rules may comprise a number of validation rules and at least one execution command, in particular query statement, that is assigned to at least one processing mining question. According to an aspect of the invention, the supported data models are determined by evaluating the validation rules in each data model of the number of data models separately.

Evaluating the validation rules in a data model results in a number of validation values based on whether the data model is classified as being supported or not being supported, i.e., invalid. The validation values may be binary values that indicate whether a certain validation criterion is met for the data model under consideration, and at least one dimensional count value that indicates a count of at least one entity in the data model, wherein the count value exceeding a predefined threshold value indicates a validity of the data model under consideration, any other appropriate value that indicates a validity of the data model under consideration, or any combination thereof.

Preferably, the process mining repository template is adapted to a process type, wherein the process type clusters processes on basis of their process steps, and wherein the predefined set of rules is enlarged by a number of rules which are extracted from the specific process type.

A process type is an empirically determined group of process instances or cases having a similar structure, e.g., similar number of process steps, similar types of process steps, belong to a similar business domain, etc.

Adapting the process mining repository template to a process type has the further advantage that the number of data models supported by the process type-based process mining repository template is effectively reduced. As a result, the efficiency in determining a sought insight starting off the initial number of data models is further increased.

In one embodiment, the predefined set of rules further comprises at least one process mining parameter. The method further comprises generating and instantiating the at least one process mining parameter by multiple algorithms running on each data model. Each process mining parameters provides a target column of the respective data model.

Preferably, at least one algorithm of the multiple algorithms determines which columns of the respective data model comprises categorical data, wherein generating as many process mining parameters as determined columns, and wherein instantiating each process mining parameter with a reference of a determined column.

Categorical data is defined as any data that may be grouped by its values. For instance, a column representing timestamps may be grouped into time intervals such as days, weeks, months, and so on. Similarly, columns representing location values may be grouped into locations such as manufacturing lines, storage locations, clusters of delivery locations, and so on. A further example may be a column representing a status code which may be grouped into status groups.

The reference of a determined column may, e.g., be its column name.

The multiple algorithms running on each data model are adapted to determine whether a column comprises categorical data. This information may be retrieved from the column names and/or column descriptions in case the data model was generated in highly standardized frameworks. Alternatively, this information may be determined from the values of the column, in particular by characterizing their distribution, by determining their data type, etc.

Generating and instantiating process mining parameters on the basis of columns comprising categorical data enables a hierarchically nested search path by way of the process mining questions. As a result, the selected data model may be explored by a drill-down approach that has proven to be particularly useful in process mining applications.

Preferably, the method further comprises determining a number of supported process mining questions for each supported data model on the basis of the predefined set of rules. For each supported process mining question, a one-bit flag is set in the process mining repository to represent the corresponding process mining question as being supported.

Preferably, each process mining question is represented by at least one query statement, wherein executing the at least one query statement on the selected data model generates the answer to the corresponding process mining question. The at least one query statement is comprised in the predefined set of rules.

The process mining question may be any question formulated using natural language which addresses a data analysis problem, wherein the answer to the process mining question corresponds to a sought insight into the data model. In its basic form, the process mining question addresses a key performance indicator.

With representing the process mining questions under the hood by at least one query statement, the process mining repository enables a coding-free analysis of the process instances stored in the selected data model. The user may select, provide and/or mark a process mining question thereby triggering an executer to execute the corresponding query statement in the selected data model. As a result, this feature provides an additional advantage, even for technically skilled analysts, according to which the query statements involved in the process analysis are less error-prone, since the query statements may be generated automatically in the backend. Further, the query statements may be optimized with respect to their execution in the data models.

Preferably, the at least one rule of the predefined set of rules is a static statement which is stored in a configuration file of the process mining repository template.

In one embodiment, the process mining repository template comprises a collection of configuration files having a generic format and a collection of algorithms being implemented into executable code. The method further comprises fetching specific ones of the configuration files and executing the algorithms using the specific configuration files in a data model, in particular in the selected data model, in order to execute method steps according to at least an aspect of the invention such as validating each data model, determining process mining parameters, providing the plausibility check, generating the process mining repository, and executing a query statement being assigned to a process mining question.

Preferably, the method further comprises appending at least one additional rule, in particular a query statement, to the predefined set of rules, in particular by way of a user interface that is in communication with a dynamic library. Built upon this dynamic library, users may add rules dynamically to the predefined set of rules which leverages further flexibility both for generating process mining repositories and conducting explorations using a process mining repository.

In one embodiment, the method further comprises executing at least one predefined rule to at least a part of the selected data model to enable a plausibility check before combining the selected data model with the process mining repository template.

Preferably, the plausibility check comprises at least a distribution of process instances, a distribution of process steps, and/or a list of process instances.

The plausibility check provides a means to eliminate supported data models that are in fact false friends of the data model which look most promising for obtaining the sought insight/information. In other words, data models which are determined to be valid with respect to the predefined set of rules may be irrelevant with respect to the process mining questions of the provided process mining repository template in case these data models fulfill the validation rules only accidently.

Preferably, the plausibility check provides a user a representation summarizing the selected data model which enables the user to rapidly perceive whether or not the selected data model is really valid or only accidently valid.

Preferably, the predefined set of rules comprises a number of rules to validate a number of requirements for a process mining on the basis of the number of process mining questions, in particular an existence of specific columns and/or relations and/or foreign-key relationships in each data model.

Preferably, the number of process mining questions comprises at least one key performance indicator, wherein the key performance indicator is standardized on the basis of the process type.

In one embodiment, a data model is supported if it supports at least one process mining question. A data model supporting none of the process mining questions of the process mining repository template is not considered valid.

In one embodiment, the method further comprises selecting a further data model and generating the process mining repository by combining the selected data models with the process mining repository template, wherein generating, for each selected data model being combined with the process mining template, an individual instance of the process mining repository.

Preferably, the method further comprises setting the flag to indicate supported process mining questions for each individual instance of the process mining repository.

SHORT DESCRIPTION OF THE FIGURES

Figure 2:
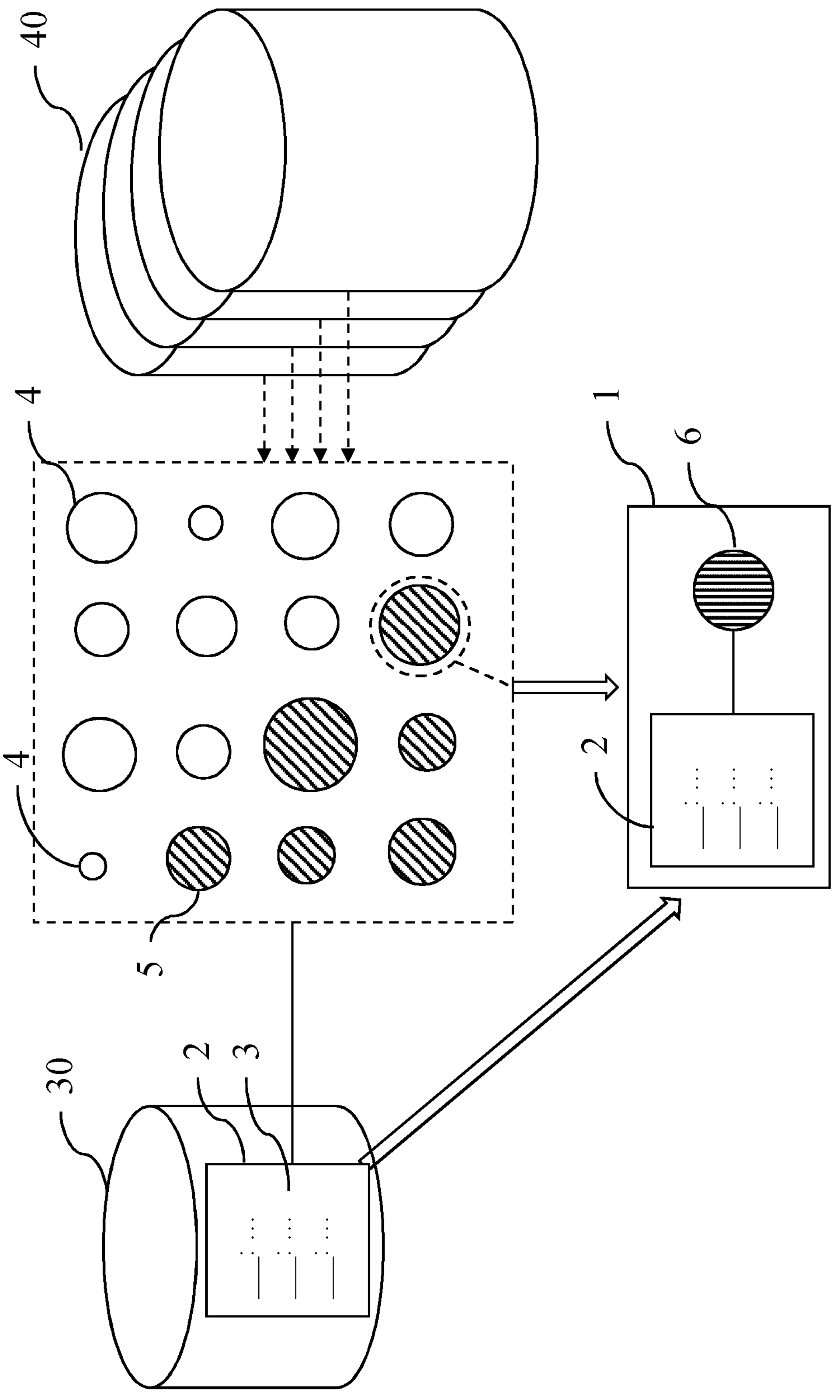
Figure 3:
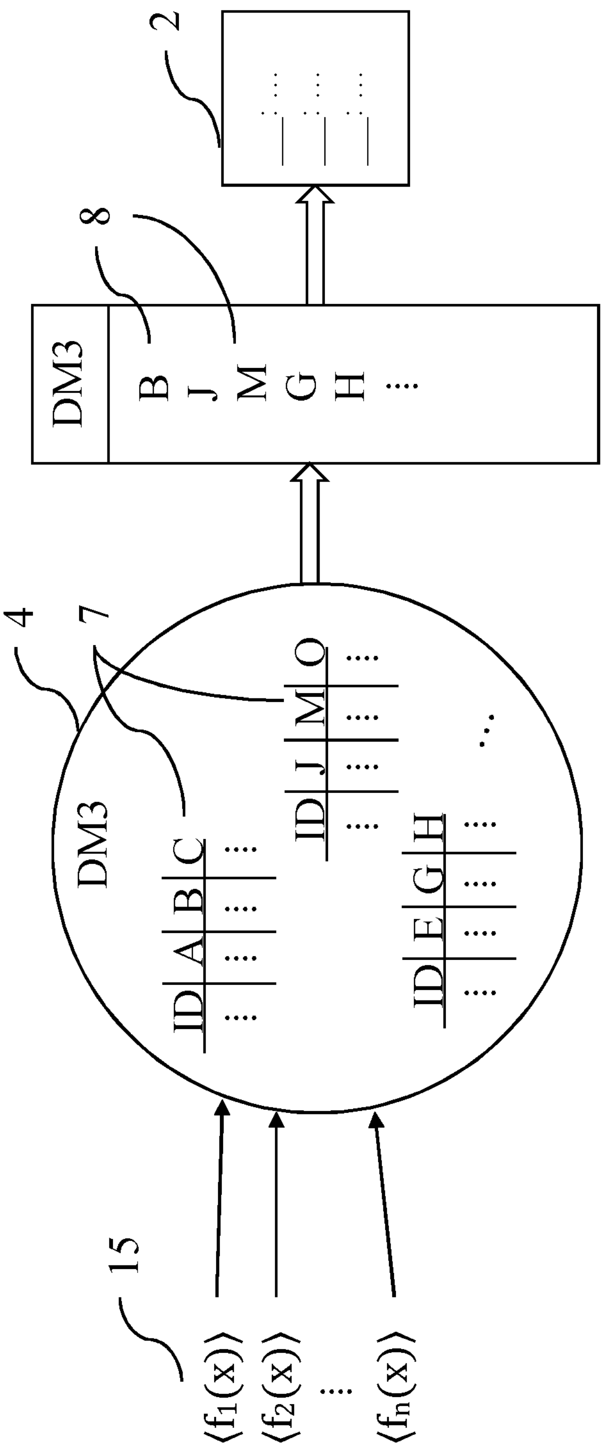
Figure 4:
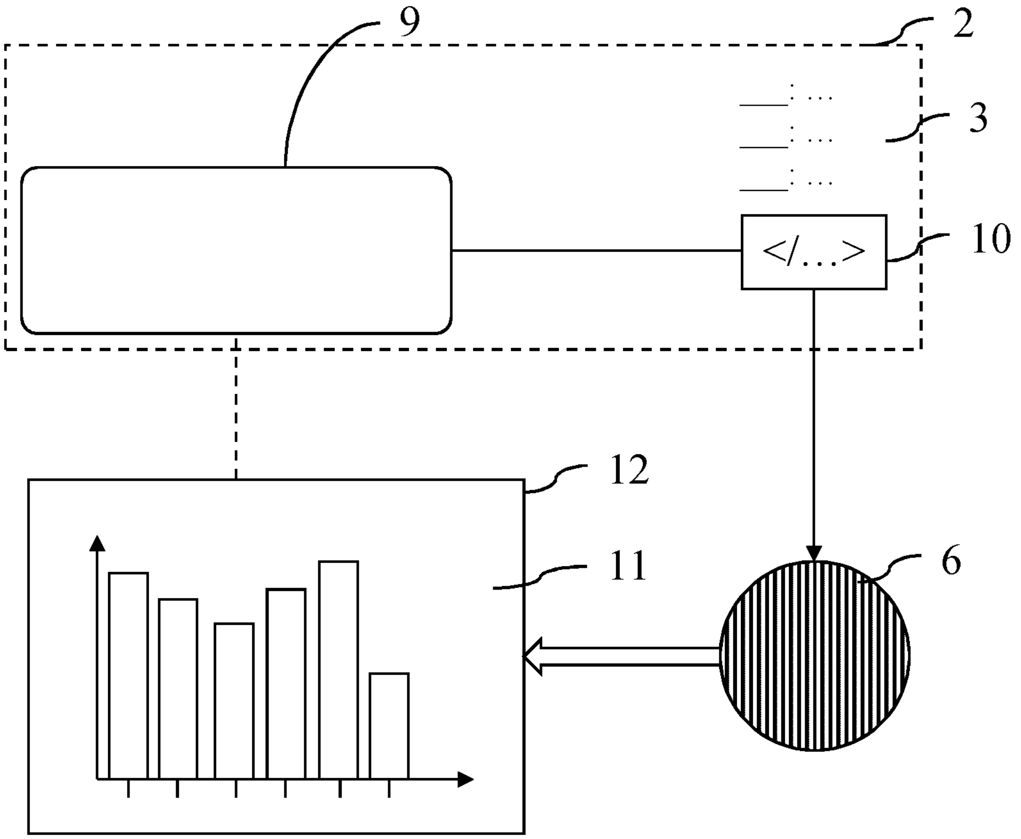
Figure 5:
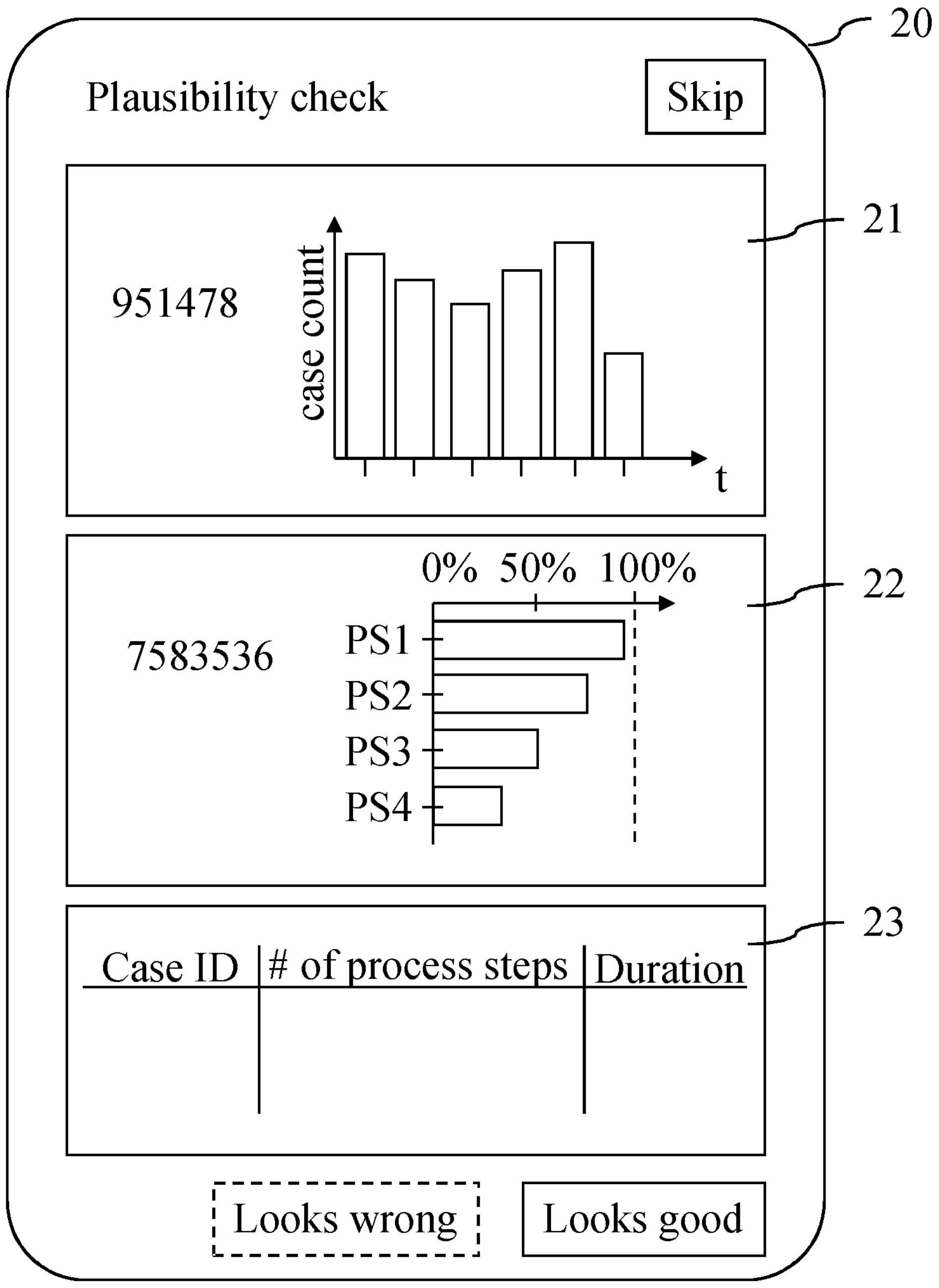

Some embodiments and aspects of the invention are explained below in combination with the figures, which show:

FIG. 1 a flow chart of an embodiment of the method according to an aspect of the invention;

FIG. 2 a schematic diagram of an embodiment of the method according to the invention;

FIG. 3 a schematic diagram of determining process mining parameters according to an aspect of the invention;

FIG. 4 a schematic diagram of generating an answer to a process mining question according to an aspect of the invention; and FIG. 5 an exemplary user interface for the plausibility check according to an aspect of the invention.

DETAILED DESCRIPTION OF THE INVENTION

FIG. 1 shows a flow chart of an embodiment of the method according to an aspect of the invention.

The generation of a new process mining repository is started by step one S1 according to which a process mining repository template 2 is provided. The process mining repository template 2 may be provided manually, in particular selected from a list of process mining repository templates being specialized for different process types. In some embodiments, one generic process mining repository template may be sufficient, such that the generic process mining repository template may also be provided automatically.

In a second step S2, supported data models 5 are determined by validating each data model 4 using the predefined set of rules of the provided process mining repository template. The predefined set of rules may be derived from a selected process mining scenario which is defined by a number of process mining questions. The second step S2 may be executed automatically for any data model and any process mining scenario.

In a third step S3, a specific one 6 of the supported data models 5 is selected. The specific data model 6 may be either selected manually or automatically based on a predefined selection criterion.

In some embodiments a plausibility check is conducted on the selected data model 6 in a fourth step S4. The plausibility check is a binary check, meaning that the selected data model 6 is either verified as plausible Y or rejected as implausible N. The plausibility check may be performed manually by way of a dedicated user interface 20 which is described further with respect to FIG. 5.

In a fifth step S5, the process mining repository 1 is generated by combining the selected data model 6 with the process mining repository template 2.

FIG. 2 a schematic diagram of an embodiment of the method according to the invention.

Processes are executed anywhere and anytime and typically also monitored. Hence, billions of process steps are recorded in short time intervals, probably within seconds, in at least one external computer system 40. Process data is traditionally recorded by recording the process steps as they are executed which are subsequently transformed into so-called event streams. An event streams is a linear sequence of process steps attributed to a single process instance. Usually, the event streams are stored in a number of data models 4 which are represented by the circles in the dashed-lined square in FIG. 2, wherein the different sizes of the circles represent different sizes of the data models 4.

Upon providing a process mining repository template 2 which comprises a predefined set of rules 3, the data models 4 are validated. The process mining repository template 2 may comprise a number of configuration files which are stored in a storage device 30, in particular in main memory.

Validating the data models 4 identifies which ones 5 of the data models 4 are supported with respect to the predefined set of rules 3, in particular with the validation rules, of the process mining repository template 2. The supported or valid data models 5 are illustrated by circles having a surface that is shaded from bottom left to top right. The supported data models are considered further, wherein the other data models (having an open surface in FIG. 2) are dropped.

The validation rules may be derived from process mining requirements of consumers of the process mining repository such as the dynamic question and answer framework or the capturing insights framework. The requirements may be translated into query statements which form part of the validation rules. These query statements may, for instance, check each data model for existing tables and columns, and be evaluated for meaningful results.

In the example of FIG. 2, one specific data model 6 was selected from the supported data models 5, wherein the selected data model 6 is surrounded in FIG. 2 by an additional dashed-lined circle.

Upon selection of the specific data model 6, the process mining repository 1 is generated by combining the process mining template repository 2 with the selected data model 6. The selected data model 6 is combined with the process mining repository template 2 by inserting a unique reference of the selected data model 6 into the process mining repository template 2.

The process mining repository 1 represents a process workspace, in which the user may conduct process mining. In one embodiment, the process workspace comprises a name, the selected process type, wherein by default a generic process type may be provided, and the selected data model 6, and is represented as a JSON entity in a relational database. Upon selection of a specific process mining question within the dynamic question and answer framework, a knowledge repository is generated dynamically from the stored JSON entity representing the process workspace by querying the current contents of the selected data model using those rules of the predefined set of rules 3 that correspond to the specific process mining question. The selected data model 6 may update in between times the process workspace is used. The knowledge repository may be returned via a representational state transfer application programming interface (REST API).

The process mining repository 1 comprises predefined functions to calculate standardized knowledge of processes across industries. The data of the data model is queried at runtime by query statements stored in the process mining repository 1 such that the query results may be visualized in consuming services of the process workspace.

FIG. 3 shows a schematic diagram of determining process mining parameters according to an aspect of the invention.

The process mining parameters 8 are determined, for each data model 4, by algorithms 15 running the data model 4. The algorithms 15 are adapted to analyze columns 7 of database tables in the data model 4 to identify target columns which comprise categorical data. Columns comprising categorical data are required to implement a drill down analysis of the process instances captured in the selected data model 6, since only categorical data may be grouped.

Further, the algorithms 15 may determine specific columns that may influence an interpretation of the process data. Examples of such columns may be a column comprising prices with currency or a column comprising due dates of an invoice. Converting the currency and/or introducing a grace period around the invoice due date may be useful inputs for tweaking an analysis result of a subsequent process exploration.

For each determined column 7 of the database tables of the data model 4 a process mining parameter 8 is generated and instantiated by a unique reference of the determined column 7.

According to the example of FIG. 3, at least the columns "B", "J", "M", "G", "H" qualify as columns 7 comprising categorical data. The process mining parameters 8 are generated and recorded in a list of process mining parameters, wherein each entry of the list stores one process mining parameter 8. Each process mining parameter 8 is instantiated by the column name of the respective column 7 comprising categorical data.

The list of process mining parameters 8 for the selected data model 6 is stored in the process mining repository template 2, e.g., as part of the predefined set of rules, such that the process mining parameters 8 are available in the process workspace for tweaking and/or filtering an analysis result.

FIG. 4 shows a schematic diagram of generating an answer to a process mining question according to an aspect of the invention.

The process mining repository template 2 comprises a number of process mining questions 9 of which each is represented by at least one query statement 10. The at least one query statement 10 may be comprised in the predefined set of rules 3.

The process mining question may be stored in a hierarchical structure of process mining questions thereby enabling a nested drill down path when analyzing process data in the selected data model 6 being combined into the process mining repository 1.

Upon selection of a process mining question, an executer (not shown) is triggered to execute the at least one query statement 10 in the selected data model 6. Since the data model 6 is selected based on a validation procedure, it is guaranteed, as long as the selected process mining question is supported, to receive a valid analysis result. The analysis result, depicted in FIG. 4 by the bar chart, may be presented to the user by way of a graphical user interface 12. The dashed line connecting the graphical user interface 12 to the process mining question 9 indicates that the generated analysis result is an answer 11 to the process mining question. Note that the answer 11 is generated by executing a predefined query statement, which is static in some embodiments and provided dynamically in other embodiments, such that the user is not required to write any code by herself.

FIG. 5 shows an exemplary user interface for the plausibility check according to an aspect of the invention.

The user interface 20 of FIG. 5 illustrates a summarizing view on the content of the selected data model 6, i.e., its recorded process instances, based on which a user may decide whether obtaining meaningful answers to the provided process mining questions in the selected data model 6 is plausible.

The plausibility check of FIG. 5 is also termed data sneak preview as it provides the user with a preview of the most relevant process-related data in the selected data model 6. The most relevant data is visualized, for instance, in a threefold way: First, in the top panel, a distribution of cases 21 such as the bar chart of case count over time, wherein the number on the left indicates the total case count; Second, in the middle panel, a distribution of process instances 22 such as the horizontal bar chart in which the process steps "PS1", "PS2, "PS3", and "PS4" are sorted according to their fraction of occurrences in process instances, wherein the number on the left indicates the total number of process steps; and Third, in the bottom panel, a list of cases 23 or case table comprising the columns "Case ID", "number of process steps", and "Duration", wherein the case table may be filtered and/or sorted interactively.

The data sneak preview allows the user to quickly state if the selected data model 6 is what she is looking for.

LIST OF REFERENCE NUMERALS

1 process mining repository
2 process mining repository template
3 set of rules
4 data model
5 supported data model
6 selected data model
7 determined column of a data model
8 process mining parameter
9 process mining question
10 query statement
11 answer to a process mining question
12 graphical user interface
15 multiple algorithms
20 user interface
21 distribution of cases
22 distribution of process steps
23 list of cases
30 storage device
40 at least one external computer system

We claim:

1. A computer-implemented method to generate a process mining repository for analyzing process data, wherein the process data is a multidimensional large-scale dataset which is extracted from at least one external computer system and transformed into a number of data models, wherein each respective data model of the number of data models comprises a number of recorded executions of processes, wherein each process comprises a number of process steps and executing the number of process steps generates a process instance, the method comprising:

providing a process mining repository template which is stored in a storage device and comprises a number of process mining questions and a predefined set of rules that provide an answer to at least one process mining question, determining a number of supported data models out of the number of data models by validating each respective data model of the number of data models using the predefined set of rules, selecting one data model of the determined subset of data models, and generating the process mining repository by combining the selected data model with the process mining repository template; and causing execution of the number of process mining questions on the selected data model via the generated process mining repository to produce an analysis result.

2. The method of claim 1, wherein the process mining repository template is adapted to a process type, wherein the process type clusters processes on basis of their process steps, and wherein the predefined set of rules is enlarged by a number of rules which are extracted from the specific process type.

3. The method of claim 2, wherein the number of process mining questions comprises at least one key performance indicator, wherein the key performance indicator is standardized on basis of the process type.

4. The method of claim 1, wherein the predefined set of rules further comprises at least one process mining parameter, wherein the method further comprises generating and instantiating the at least one process mining parameter by multiple algorithms running on each data model, and wherein each process mining parameters provides a target column of the respective data model.

5. The method of claim 4, wherein at least one algorithm of the multiple algorithms determines which columns of the respective data model comprises categorical data, wherein generating as many process mining parameters as determined columns, and wherein instantiating each process mining parameter with a reference of a determined column.

6. The method of claim 1, further comprising determining a number of supported process mining questions for each supported data model on the basis of the predefined set of rules, wherein for each supported process mining question a flag is set in the process mining repository to represent the corresponding process mining question as being supported.

7. The method of claim 1, wherein each process mining question is represented by at least one query statement, wherein executing the at least one query statement in the selected data model generates the answer to the corresponding process mining question, and wherein the at least one query statement is comprised in the predefined set of rules.

8. The method of claim 1, wherein at least one rule of the predefined set of rules is a static statement which is stored in a configuration file of the process mining repository template.

9. The method of claim 1, further comprising appending at least one additional rule, in particular a query statement, to the predefined set of rules, in particular by way of a user interface that is in communication with a dynamic library.

10. The method of claim 1, further comprising executing at least one predefined rule to at least a part of the selected data model to perform a plausibility check before combining the selected data model with the process mining repository template.

11. The method of claim 10, wherein the plausibility check comprises at least a distribution of process instances, a distribution of process steps, and/or a list of process instances.

12. The method of claim 1, wherein the predefined set of rules comprises a number of validation rules to validate a number of requirements for a process mining on basis of the number of process mining questions, in particular an existence of specific columns and/or relations and/or foreign-key relationships in each data model.

13. The method of claim 1, further comprising selecting a further data model and generating the process mining repository by combining the selected data models with the process mining repository template, and generating, for each selected data model being combined with the process mining repository template, an individual instance of the process mining repository.

14. The method of claim 1, further comprising:

determining a number of supported process mining questions for each supported data model on the basis of the predefined set of rules, wherein for each supported process mining question a first flag is set in the process mining repository to represent the corresponding process mining question as being supported;

selecting a further data model and generating the process mining repository by combining the selected data models with the process mining repository template, and generating, for each selected data model being combined with the process mining repository template, an individual instance of the process mining repository; and setting a second flag to indicate supported process mining questions for each individual instance of the process mining repository.

* * * * *